United States Patent [19]
Yu et al.

[11] Patent Number: 5,772,901
[45] Date of Patent: Jun. 30, 1998

[54] OIL/WATER/BIOCATALYST THREE PHASE SEPARATION PROCESS

[75] Inventors: Li-Qun Yu, Houston; Todd A. Meyer; Brian R. Folsom, both of The Woodlands, all of Tex.

[73] Assignee: Energy BioSystems Corporation, The Woodlands, Tex.

[21] Appl. No.: 640,129

[22] Filed: Apr. 30, 1996

[51] Int. Cl.$^6$ .......................... B01D 21/26; B01D 17/038
[52] U.S. Cl. .......................... 210/896; 210/788; 210/808; 210/512.2; 366/165.1
[58] Field of Search .................................. 210/787, 788, 210/806, 808, 512.2; 366/165.1

[56] References Cited

U.S. PATENT DOCUMENTS

| | | | |
|---|---|---|---|
| 4,836,935 | 6/1989 | Lilienthal | 210/788 |
| 4,938,876 | 7/1990 | Ohsol | 210/708 |
| 5,080,792 | 1/1992 | McGovern et al. | 210/512.1 |
| 5,227,061 | 7/1993 | Bedsole | 210/304 |
| 5,350,525 | 9/1994 | Shaw et al. | 210/512.2 |
| 5,356,801 | 10/1994 | Rambosek et al. | 435/195 |
| 5,507,958 | 4/1996 | White-Stevens | 210/788 |
| 5,525,235 | 6/1996 | Chen et al. | 210/806 |

FOREIGN PATENT DOCUMENTS

| | | |
|---|---|---|
| WO86/03143 | 6/1986 | WIPO . |
| WO86/03696 | 7/1986 | WIPO . |
| WO92/19350 | 11/1992 | WIPO . |
| WO92/19351 | 11/1992 | WIPO . |
| WO92/19352 | 11/1992 | WIPO . |
| WO95/31516 | 11/1995 | WIPO . |

OTHER PUBLICATIONS

Gary, J. H. and Handwerk, G. E., "Petroleum Refining: Technology and Economics", *Marcel Dekker, Inc., New York*, pp. 114–120 (1975).
Speight, J.G., "The Hydrodesulfurization Process", *The Desulfurization of Heavy Oils & Residue, Marcel Dekker, Inc., New York* pp. 119–127 (1981).
Monticello, D. J., "Microbial Desulfurization of Fossil Fuels", *Ann. Rev. Microbiol.* 39:371–389.

*Primary Examiner*—David A. Reifsnyder
*Attorney, Agent, or Firm*—Hamilton, Brook, Smith & Reynolds, P.C.

[57] ABSTRACT

A method and an apparatus for separating a water/organic/solid emulsion, wherein the solid comprises particles having a length of about 50 $\mu$m or less, are disclosed. The method comprises the steps of (1) directing the water/organic/solid emulsion from an emulsion source through a first hydrocyclone; (2) inverting the phase of the overflow emulsion from the first hydrocyclone; (3) directing the overflow emulsion through one or more subsequent hydrocyclones arranged in series; and (4) collecting the aqueous phase and the organic phase. The solid can be a biocatalyst, such as an intact bacterial, fungal or yeast cell. The organic phase is a liquid material substantially comprising carbon, which is substantially immiscible with water, such as petroleum. The apparatus of the present invention comprises a hydrocyclone series comprising two or more hydrocyclones connected in series, wherein the intake tube of the first hydrocyclone is connected by a line to an emulsion source; and a means for inverting the phase of the emulsion, interposed in the hydrocyclone series. The hydrocyclone series can comprise one or more de-oiling hydrocyclones, one or more dehydrating hydrocyclones or a combination thereof. The means for inverting the emulsion can be any means for sufficiently agitating the emulsion.

19 Claims, 1 Drawing Sheet

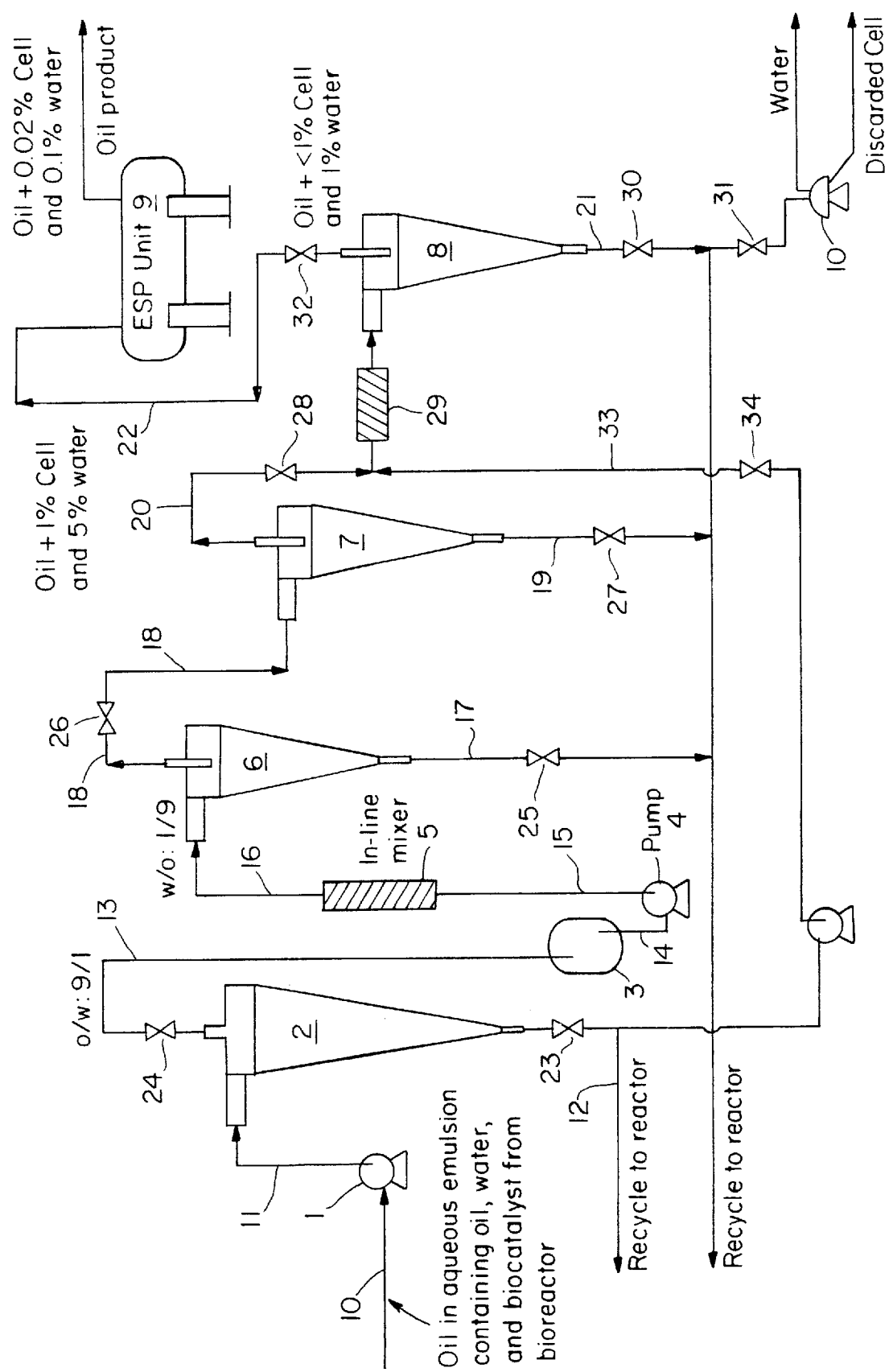
The Figure

OIL/WATER/BIOCATALYST THREE PHASE SEPARATION PROCESS

BACKGROUND OF THE INVENTION

The combustion of sulfur-containing fossil fuels generates a number of problems, including corrosion of pipeline, pumping and refining equipment, and catalyst poisoning. In addition, sulfur combustion products, such as sulfur dioxide, contribute significantly to acid rain. The removal of sulfur from crude oil is, therefore, a critical step in oil refining, and growing even more important as low-sulfur oil reserves are depleted and environmental regulations become more restrictive. Sulfur in crude oil can occur in two distinct forms: inorganic sulfur, primarily sulfides or sulfates, and organic sulfur, wherein a sulfur atom is present in an organic compound. This group of compounds includes thioethers, mercaptans, sulfoxides, and sulfur-containing heteroaromatic compounds.

The standard process for crude oil desulfurization is hydrodesulfurization (HDS), in which carbon-sulfur bonds are reductively cleaved by reaction with hydrogen at elevated temperature and pressure in the presence of a heterogeneous catalyst, such as molybdenum disulfide (Gary et al., Petroleum Refining: Technology and Economics, Marcel Dekker, Inc., New York, 114–120 (1975); Speight, The Desulfurization of Heavy Oils and Residue, Marcel Dekker, Inc., New York, 119–127 (1981)). There are several disadvantages inherent in the HDS process. For example, it is an energy-intensive process, due to the high temperatures and pressures required, as is the production of the hydrogen necessary for the process. In addition, the primary sulfur-containing product of this process is hydrogen sulfide, a highly toxic gas, which can poison the catalyst and, thus, must be continuously removed from the reactor. Moreover, certain organosulfur compounds commonly found in petroleum react slowly, if at all, under typical HDS conditions. Thus, even HDS-treated fuels can often require the post-combustion removal of sulfur-containing combustion products.

The problems associated with HDS have motivated the development of biodesulfurization (BDS), a process broadly described as harnessing the metabolic processes of suitable bacteria to the removal of sulfur from organic molecules (Monticello et. al., *Ann. Rev. Microbiol.* 39 : 371–389 (1985)). BDS, thus, is performed under mild conditions, using a catalyst capable of replenishing itself. BDS methods have been developed which are capable of desulfurizing even the compounds most refractory toward HDS.

BDS utilizes a heterogeneous system composed of oil, water and the biological catalyst, which typically comprises intact bacterial cells. The output of this process generally consists of a substantially pure oil phase, an aqueous phase containing the biological catalyst, and a three phase oil/water/biological catalyst emulsion, produced by the strong shear forces employed in the BDS reactor. The economic viability of the BDS process requires the cost-effective recovery, in substantially pure form, of the oil present in the emulsion, a significant technical challenge which has not previously been met in an entirely successful manner.

There is, thus, a need for a method and an apparatus for recovering substantially pure oil from the three phase oil/water/biocatalyst emulsion resulting from the BDS process.

SUMMARY OF THE INVENTION

The invention is based on the unexpected discovery that in the separation of a mixture comprising an emulsion and a fine solid, such as that produced in a BDS process, in a hydrocyclone, the solid separates with the discontinuous phase of the emulsion. This discovery permits the manipulation of the phase to which the solid will migrate by determining or manipulating the continuous and discontinuous phases of the emulsion.

The present invention relates to a method and an apparatus for separating a water-miscible/water-immiscible/solid emulsion, wherein the solid comprises fine particles, such as particles having at least one dimension which is smaller than about 50 $\mu$m, into a water-miscible phase and a water-immiscible phase. The phase with which the solid is separated can be manipulated by determining the discontinuous phase of the emulsion.

In one embodiment, the method comprises the steps of (1) directing the water-miscible/water-immiscible/solid emulsion through a first hydrocyclone; (2) inverting the emulsion (i.e. interchanging the continuous/discontinuous phases) from the first hydrocyclone; (3) directing the overflow emulsion through one or more subsequent hydrocyclones arranged in series; and (4) collecting the water-miscible or aqueous phase and the water-immiscible or organic phase. The solid will be collected with the discontinuous phase of the emulsion.

The solid can be a fine organic or inorganic particle, for example, a particle having at least one dimension which is less than about 50 $\mu$m, preferably less than about 30 $\mu$m, more preferably less than about 10 $\mu$m. In a particularly preferred embodiment, the solid is a biocatalyst or biomass, such as an intact bacterial, fungal or yeast cell.

The water immiscible, oil or organic phase can be any non-polar liquid, for example, a liquid fossil fuel, such as petroleum or a petroleum distillate, a synthetic oil, such as a silicone oil, a hydrocarbon or mixed hydrocarbon, or a fat or mixture of fats, such as a vegetable oil or animal fat.

The phase of the emulsion in step (2) can be inverted by agitating the emulsion with sufficient shear force to invert the phases. This can be done, for example, by directing the emulsion through a mixer, such as a static in-line mixer or by subjecting the emulsion to a sufficiently large pressure drop.

The apparatus of the present invention comprises a hydrocyclone series comprising two or more hydrocyclones connected in series, wherein the intake tube of the first hydrocyclone is connected by a line to an emulsion source; and a means for inverting the phase of the emulsion, interposed in the hydrocyclone series. The hydrocyclone series can comprise one or more "de-oiling" hydrocyclones and/or one or more "dehydrating" hydrocyclones. The emulsion can be inverted from water-continuous to oil-continuous can be any means for sufficiently agitating the emulsion, such as a static in-line mixer.

Other embodiments of the present system further comprise additional elements. For example, the system can comprise one or more pumps interposed in the hydrocyclone series to pressurize the emulsion at specific points in the system. Another embodiment further comprises a de-watering means or unit, such as an electrostatic precipitation unit, placed in the series following the ultimate dehydrating hydrocyclone. The apparatus can also comprise lines leading from the underflow ends of the hydrocyclones to the BDS reactor, as well as a centrifuge connected by a line to the underflow end of the ultimate dehydrating hydrocyclone, to separate the biocatalyst from water.

The present invention provides a number of advantages. It enables high yield recovery of highly pure oil from a water-continuous oil/water/biocatalyst emulsion, such as can result from a BDS process. It also provides for the recycling of water and biocatalyst from the emulsion back to the BDS reactor, adding to the efficiency of the system. Finally, it comprises a relatively simple apparatus with few moving parts, which is, therefore, relatively inexpensive to construct and easy to maintain.

BRIEF DESCRIPTION OF THE DRAWING

The FIGURE is a schematic illustration of an apparatus for separating the components of a three phase oil/water/biocatalyst emulsion according to the invention.

DETAILED DESCRIPTION OF THE INVENTION

The present invention relates to a method and an apparatus for separating a water/organic/solid emulsion, wherein the solid comprises fine particles. In one embodiment, the invention provides a method for separating substantially pure oil from a water-continuous three phase oil/water/biocatalyst emulsion. This method enables the recovery of oil comprising less than about 0.1% by volume water and cells from such emulsions produced, for example, in a BDS reactor.

The term "overflow" as used herein refers to the phase that emerges from the output tube at the top, or wide end, of a hydrocyclone. The principles underlying hydrocyclonic separation require that this phase be the less dense of the phases separated by the hydrocyclone. The term "underflow" as used herein refers to the phase emerging from the output tube at the bottom, or narrow end, of the hydrocyclone, this being the more dense of the phases separated by the hydrocyclone.

The term "series" as used herein refers to a collection of elements, such as hydrocyclones, pumps and valves, connected together sequentially by lines suitable for conducting an emulsion from one element to the next element in the sequence. In a series of hydrocyclones, the overflow end of a first hydrocyclone is connected by a line to the intake tube of the next hydrocyclone in the series. There can also be additional elements interposed in the line connecting two hydrocyclones. In such an embodiment, the underflow of the first de-oiling hydrocyclone is directed to a second de-oiling hydrocyclone. The overflow from the second de-oiling hydrocyclone can then be directed to one or more dehydrating hydrocyclones, such as will be described below. The overflow from the second de-oiling hydrocyclone can then be recovered. Additionally, one or more hydrocyclones or other elements can be connected in parallel. It is desirable, for example, to employ one or more hydrocyclones in parallel to one or more of the above-described hydrocyclones to increase the volume of the apparatus.

The term "biocatalyst" as used herein refers to any solid or insoluble catalytic material of biological origin. That is, the biocatalyst is present in the emulsion as a solid. The biocatalyst can be homogeneous or heterogeneous, and can be a cellular biocatalyst, for example, an intact cell, such as a bacterial cell, a fungal cell or a yeast cell, or a cell fragment. In a BDS process, the biocatalyst catalyzes the cleavage of carbon-sulfur bonds. One example of such a biocatalyst is an intact cell of the bacterium Rhodococcus strain IGTS8 (ATCC No. 53968), which houses a collection of enzymes which cleave carbon-sulfur bonds, or a recombinant microorganism thereof, as described in U.S. Pat. No. 5,356,801, issued to Rambosek et al., the contents of which are incorporated herein by reference.

In one embodiment, the method of the present invention for the separation of a water-miscible/water-immiscible/solid emulsion, wherein the solid comprises fine particles, comprises the steps of (1) directing the water-miscible/water-immiscible/solid emulsion through a first hydrocyclone; (2) inverting the phase of the overflow emulsion from the first hydrocyclone; (3) directing the overflow emulsion through one or more subsequent hydrocyclones arranged in series; and (4) collecting the aqueous phase and the water-immiscible phase.

The water-miscible phase can comprise water or an aqueous solution with one or more solutes, such as salts, acids, bases, polar organic compounds or biomolecules, such as proteins. In another embodiment, the water-miscible phase is a liquid polar organic compound, such as a $C_2$–$C_4$-alcohol.

The water-immiscible component of the emulsion can comprise any material which forms a liquid and is substantially immiscible with water. Such materials include liquid fossil fuels, such as petroleum and petroleum distillates, aliphatic and aromatic hydrocarbons and derivatives and mixtures thereof, mineral oils, synthetic oils, such as silicone oils, vegetable oils and modified, for example, partially hydrogenated, vegetable oils, and animal fats and modified animal fats.

The emulsion source can be, for example, a BDS reactor, such as a batch stirred reactor. The emulsion source can also be any other bioreactor which utilizes a heterogeneous water/organic reaction medium and a solid or particulate biocatalyst, such as bacterial, fungal or yeast cells. Another suitable emulsion source is any reactor employing a water/organic reaction medium and a finely divided heterogenous catalyst, such as a finely divided metal or inorganic powder, or that yields a product in the form of a finely divided powder, which is insoluble in either the water phase or the organic phase. In another embodiment, the emulsion can be obtained or made directly from a natural source, such as a fossil fuel deposit, or a fossil fuel processing facility. In this embodiment, the solid can be a fine silt, for example.

The phase of the overflow emulsion of step (2) can be inverted by agitating the emulsion, for example, by passing the emulsion through an in-line mixer, such as a static in-line mixer. In another embodiment, the pressure drop across a hydrocyclone, preferably the first hydrocyclone, produces shear forces sufficient to invert the emulsion.

In another embodiment, the method further comprises the step of pressurizing the overflow emulsion of step (2), for example, by directing said emulsion through a pump, such as a positive displacement pump, prior to directing the emulsion to the hydrocyclone series of step (c). The emulsion can also be pressurized at other points in the process, such that suitable emulsion pressurization is maintained for hydrocyclonic separation.

In a further embodiment, the hydrocyclone series of step (c) comprises two or more hydrocyclones. These hydrocyclones can be de-oiling hydrocyclones, dehydrating hydrocyclones or a combination thereof.

In a preferred embodiment, the method of the present invention comprises the steps of: (1) directing a water-continuous oil/water/biocatalyst emulsion from an emulsion source into a de-oiling hydrocyclone, (2) inverting the oil-enriched overflow emulsion from the hydrocyclone, thereby forming an oil-continuous oil-enriched emulsion, (3) directing the oil-continuous oil-enriched overflow emulsion through one or more dehydrating hydrocyclones connected in series, and (4) collecting the substantially pure oil.

In one embodiment of the present method, the oil/water/biocatalyst emulsion to be separated comes from a BDS reactor, and comprises from about 50% to about 90% by volume water and biocatalyst combined, and from about 10% to about 50% by volume oil. The composition will typically be about 75% by volume water and biocatalyst combined, and about 25% by volume oil. The water-biocatalyst/oil ratio will generally be greater than about 1:1, preferably greater than about 2:1 and more preferably greater than about 3:1. The emulsion can exit the BDS reactor at a temperature of about 30° C. and a pressure of about 40 psi.

The water/oil/biocatalyst emulsion from the BDS reactor is pressurized, for example, to at least about 120 psi, by directing the emulsion through a pump, such as a positive displacement pump, before it enters the de-oiling hydrocyclone. The oil-enriched overflow from the de-oiling hydrocyclone can also be directed through a pump, connected in the series, before it enters the first or subsequent dehydrating hydrocyclone. In a further embodiment, fine water droplets, from about 2% to about 10%, preferably about 5%, by volume relative to the emulsion, are mixed with the oil-enriched overflow emulsion from one dehydrating hydrocyclone, which remains oil-continuous, before it enters a subsequent dehydrating hydrocyclone. Preferably, the water droplets are added to the oil-enriched overflow from the penultimate dehydrating hydrocyclone before it enters the ultimate dehydrating hydrocyclone. The added water droplets attract the residual biocatalyst cells, further facilitating their separation from the oil. The water/biocatalyst-containing underflow from the ultimate dehydrating hydrocyclone can be directed to a centrifuge, whereby the biocatalyst and the water are separated.

The oil-enriched overflow emulsion from the ultimate dehydrating cyclone can be collected or further purified by passage through a de-watering means, such as a settling tank, a centrifuge, a coalescing membrane filter, a cross-flow filter, or, preferably, an electrostatic precipitation unit, prior to being collected, depending upon the purity requirements of the oil.

In a further embodiment, the invention provides a method for separating an oil-continuous water/oil/biocatalyst emulsion into an aqueous, biocatalyst-containing phase and a substantially pure oil-containing phase comprising directing the emulsion through one or more dehydrating hydrocyclones and collecting the substantially pure oil-containing phase.

In an additional embodiment, the invention includes a method for separating solid particles with a preselected phase from an emulsion comprising the solid particles, a first liquid phase, and a second liquid phase. The method comprises directing the emulsion wherein the pre-selected phase is the discontinuous phase of the emulsion through one or more hydrocyclones and collecting the solid particles in said pre-selected phase.

The apparatus of the present invention for separating a water-miscible/water-immiscible/solid emulsion, wherein the solid comprises fine particles, into a water-miscible phase and a water-immiscible phase, comprises two or more hydrocyclones connected in series, wherein the intake tube of the first hydrocyclone is connected by a line to an emulsion source; and a means for inverting the phase of the emulsion, interposed in the hydrocyclone series.

In a preferred embodiment, the apparatus of the present invention comprises (1) a hydrocyclone series comprising one or more de-oiling hydrocyclones and one or more dehydrating hydrocyclones, wherein the intake tube of the first hydrocyclone is connected to an emulsion source by a line, and (2) a means for inverting the emulsion from water-continuous to oil-continuous interposed in the hydrocyclone series prior to a dehydrating hydrocyclone. A suitable de-oiling hydrocyclone for the present purpose is a Vortoil de-oiling hydrocyclone, model VAO5110 (Vortoil Separation Systems, U.S.A., Houston, Tex.). The dehydrating hydrocyclones can each be, for example, a Vortoil model KS dehydrating hydrocyclone.

The means for inverting the emulsion from water-continuous to oil-continuous is preferably interposed in the hydrocyclone series before the first dehydrating hydrocyclone and can be any means of agitating the emulsion with sufficient shear force to invert the emulsion. This can be done with an in-line mixer, for example, a static mixer comprising one or more static mixing elements. The mixer causes highly turbulent flow and high shear mixing, inducing a phase inversion of the emulsion. One example of a static mixing element suitable for the present purpose is a Koch static mixer, type number 1" SMV-CX (Koch Engineering Co., Inc., Houston, Tex.). The phase inversion can also be induced by a sufficient pressure drop at the overflow end of the de-oiling hydrocyclone. In this case the oil-enriched emulsion which emerges from the overflow end of the de-oiling hydrocyclone is oil-continuous.

In a preferred embodiment, the apparatus comprises three dehydrating hydrocyclones. In another embodiment, the system further comprises one or more pumps, such as positive displacement pumps, which are interposed in the hydrocyclone series to maintain the emulsion under suitable pressure for hydrocyclonic separation. One pump, for example, can be connected by a line to the intake tube of the de-oiling hydrocyclone, whereby the oil/water/biocatalyst emulsion is pressurized prior to entering the de-oiling hydrocyclone. A suitable pump is a Moyno 2000 positive displacement pump (Moyno Industrial Products, Inc., Springfield, Ohio). The system can also comprise one or more valves, such as globe valves or regulating valves, which are interposed in the hydrocyclone series and can control the movement of the emulsion through the apparatus.

In further embodiments, the apparatus additionally comprises a surge tank interposed in the hydrocyclone series between the de-oiling hydrocyclone and the first dehydrating hydrocyclone. The surge tank can be any vessel, preferably fabricated of stainless steel, able to withstand the operating pressure of the apparatus and chemically compatible with the emulsion materials. The system can further comprise a mixing valve, connected to a source of water, interposed in the hydrocyclone series prior to the ultimate dehydrating hydrocyclone. The mixing valve is preferably interposed in the hydrocyclone series between the penultimate dehydrating hydrocyclone and the ultimate dehydrating hydrocyclone. The mixing valve can add water, in the form of fine droplets, to the oil-enriched emulsion. These droplets further attract biocatalyst cells and facilitate their separation from the oil.

In another embodiment, the apparatus further comprises a de-watering means connected by a line to the overflow end of the ultimate dehydrating hydrocyclone. The de-watering means can be, for example, a settling tank, a centrifuge, a coalescing membrane filter, a cross flow filter, or, preferably, an electrostatic precipitation unit. One example of a suitable electrostatic precipitation unit is, for example, a Petrico meter cell electrostatic precipitator (Petrico Inc., St. Louis, Mo.). In a yet further embodiment, the system additionally comprises a centrifuge, such as a Westphalia model CA22-000 clarifier/decanter centrifuge (Westphalia Separator AG, Oelde, Germany), connected by a line to the underflow end of the ultimate dehydrating hydrocyclone.

A preferred embodiment of the present invention comprises the apparatus depicted schematically in the FIGURE and the method of use of this apparatus. A water-continuous oil/water/biocatalyst emulsion enters the apparatus from the emulsion source, for example, a batch-stirred BDS reactor, through line 10 at a temperature of about 30° C. This emulsion comprises from about 1 to about 100 g/L biocatalyst, such as intact cells of Rhodococcus strain IGTS8, from about 50% to about 90% by volume water and biocatalyst combined, and from about 10% to about 50% by volume oil. The emulsion is pressurized, for example, to a pressure of at least about 120 psig, by passage through pump 1 (for example, a Moyno model 2000 positive displacement pump).

The emulsion is then directed, at a flow rate in the range from about 250 to about 350 gallons per minute (gpm), through line 11 into de-oiling hydrocyclone 2. The aqueous underflow from de-oiling hydrocyclone 2 (for example, a Vortoil model VAO5110) emerges at a flow rate of from about 175 to about 245 gpm at a pressure in the range of about 60 to about 80 psig, and comprises from about 0.1 to about 10 g/L biocatalyst, from about 50% to about 99% by volume water and cells, and from about 1% to about 50% by volume oil.

This emulsion is directed, through line 12, which is controlled by valve 23, back to the emulsion source, e.g., the BDS reactor. The oil-enriched overflow emulsion from de-oiling hydrocyclone 2 emerges at a flow rate of about 75 to about 105 gpm, at a pressure of from about 20 to about 50 psig and comprises from about 0.9 to about 90 g/L biocatalyst, from about 1% to 50% by volume water and biocatalyst combined, and from about 50% to about 99% by volume oil.

This emulsion is directed, through valve 24 and line 13, through surge tank 3, and then, via line 14, through pump 4 (for example, another Moyno model 2000 positive displacement pump), where it is pressurized to a pressure in the range from about 400 psig to about 600 psig while maintaining a flow rate in the range of about 75 to about 105 gpm. This emulsion is then directed through line 15 into static in-line mixer 5, which comprises about 4 static mixing elements (for example, a Koch static mixer type number 1" SMV-CX), in which the oil-enriched emulsion is inverted from water-continuous to oil-continuous. All subsequent emulsions in the process are also oil-continuous.

The oil-continuous emulsion emerges from the static in-line mixer at a pressure in the range from about 380 to about 580 psig and is then directed, through line 16, into first dehydrating hydrocyclone 6 (this and subsequent dehydrating hydrocyclones can be, for example, Vortoil model KS dehydrating hydrocyclones). The aqueous underflow from dehydrating hydrocyclone 6 emerges at a flow rate of from about 7.5 to about 10.5 gpm at a pressure in the range from about 280 to about 480 psig. This emulsion comprises from about 0.8 to about 80 g/L biocatalyst, from about 95% to about 99.9% by volume water and biocatalyst combined, and from about 0.1% to about 5% by volume oil, and is directed, through line 17, which is controlled by valve 25, back to the emulsion source.

The overflow from dehydrating hydrocyclone 6 emerges at a flow rate of from about 67 to about 95 gpm at a pressure in the range from about 280 to about 480 psig, and comprises from about 0.1 to about 1.0 g/L biocatalyst, from about 0.1 to about 0.5% by volume water and biocatalyst combined and from about 95% to about 99.9% by volume oil. This emulsion is then directed, through line 18, controlled by valve 26, into second dehydrating hydrocyclone 7. The aqueous underflow from dehydrating hydrocyclone 7 emerges at a flow rate of from about 6.5 to about 9.5 gpm at a pressure in the range of about 180 to about 380 psig. This emulsion comprises from about 0.99 to about 9 g/L biocatalyst, from about 97% to about 99% by volume water and biocatalyst combined, and from about 1% to about 3% by volume oil, and is directed, through line 19, controlled by valve 27, back to the emulsion source.

The overflow emulsion from dehydrating hydrocyclone 7 emerges at a flow rate of about 60 to about 86 gpm at a pressure in the range of about 180 to 380 psig, and comprises from about 0.01 to about 1 g/L biocatalyst, from about 0.1% to about 2.5% by volume water and biocatalyst combined, and about 97.5% to about 99.9% by volume oil. This emulsion is directed through line 20, controlled by valve 28. To the emulsion is added water, from about 2% by volume to about 10% by volume, preferably about 5% by volume, which is directed to line 20 through line 33, which is controlled by valve 34. The water can be recycled from earlier steps in the process, such as from the underflow of the deoiling hydrocyclone as shown, or it can come from a source external to the apparatus. The resulting mixture is then directed through static in-line mixer 29, which comprises about 4 static mixing elements (for example, a Koch static mixer type number 1" SMV-CX).

The resulting emulsion comprises from about 2.5% to about 5% by volume water and biocatalyst combined, and from about 95% to about 97.5% by volume oil. This emulsion is then directed, through line 20, into third dehydrating hydrocyclone 8. The underflow from dehydrating hydrocyclone 8 emerges at a flow rate of about 6 to about 9 gpm at a pressure in range of about 80 to about 280 psig and comprises from about 0.5 to about 0.99 g/L biocatalyst, from about 99% to about 99.9% by volume water and biocatalyst combined, and from about 0.1% to 1% by volume oil.

This emulsion is directed, through line 21, which is controlled by valve 30, either back to the BDS reactor or through valve 31 to centrifuge 10 (Westphalia model CA22-n 000), which separates the biocatalyst from the water. The overflow emulsion from dehydrating hydrocyclone 8 emerges at a flow rate in the range of about 55 to about 80 gpm at a pressure of about 80 to about 280 psig. This emulsion comprises from about 0.01 to about 0.5 g/L biocatalyst, 0.1% to 1% by volume water and biocatalyst combined, and from about 99% to about 99.9% by volume oil, and is directed, through valve 32 and line 22, into electrostatic precipitation unit 9 (for example, a Petrico meter cell). The substantially pure oil emerges from electrostatic precipitation unit 9 at a flow rate of about 55 to about 80 gpm at a pressure in the range from about 1 to about 10 psig and comprises from 0 to about 0.01 g/L biocatalyst, from about 0% to about 0.01% by volume water and biocatalyst combined, and from about 99.99% to about 100% by volume oil. This oil is collected.

The method and apparatus of the present invention can be tailored to provide oil of the desired degree of purity. For example, the number of dehydrating hydrocyclones in the hydrocyclone series can be varied, with fewer dehydrating hydrocyclones employed when oil of relatively low purity is acceptable, and more dehydrating hydrocyclones used when oil of higher purity is desired. The oil emerging from the ultimate dehydrating hydrocyclone can be collected or subjected to electrostatic precipitation prior to collection, depending upon the purity requirements of the oil.

The removal of the biocatalyst, for example, bacterial cells, from the oil is based on the observation that in an emulsion the cells remain with the dispersed phase, whether oil or water. The emulsion generated in a BDS reactor, such as a batch stirred reactor, typically comprises about 75% by volume water and biocatalyst combined, and about 25% by volume oil, and is water-continuous, i.e., the dispersed phase is oil. The overflow from the de-oiling hydrocyclone, unless inverted by the pressure drop across the de-oiling hydrocyclone, remains water-continuous, despite the fact that the emulsion is now greatly enriched in oil, with a typical composition of 10% by volume water and biocatalyst combined and 90% by volume oil. The in-line mixer, described above, applies sufficient shear force to the entering water-continuous emulsion that this emulsion is inverted to become oil-continuous.

The apparatus can also be operated under conditions in which the pressure drop across the de-oiling hydrocyclone is great enough to produce sufficient shear forces to invert the oil-enriched emulsion emerging from the overflow end. Thus, from this point, the cells stay with the aqueous phase and are removed with the water via passage through the dehydrating hydrocyclones.

The invention will now be further and specifically described by the following example.

Exemplification

In one example of the method, the biocatalyst comprised intact cells of Rhodococcus strain IGTS8 (ATCC No. 53968). The water-continuous oil/water/biocatalyst emulsion from a batch-stirred BDS reactor had the composition 75% by volume water and cells combined and 25% by volume oil, and entered the apparatus of the FIGURE at a temperature of 30° C. and a pressure of 40 psi. The emulsion was pressurized by pump 1 to 120 psi prior to entering the de-oiling hydrocyclone at a flow rate between about 250 and 350 gallons per minute (gpm).

The underflow from the de-oiling hydrocyclone was at 50 psi pressure and had the composition 95% by volume water, 5% by volume oil and cells combined. The overflow from the de-oiling hydrocyclone was 90% by volume oil at a pressure of 20 psi, with the balance comprising water and cells, and was water-continuous, as shown by conductance measurements. The emulsion was inverted from water-continuous to oil-continuous by passage through the static in-line mixer, as verified by conductance measurements.

After passage through first dehydrating hydrocyclone 6, 99% of the original water and cells had been removed. An about 3% clean water stream was added to the overflow emulsion from second dehydrating hydrocyclone 7 through a mixing nozzle, creating fine water droplets within the emulsion. The overflow from third dehydrating cyclone 8 contained less than 1% by volume water and 0.2% by volume cells. The effluent from the electrostatic precipitation unit was 99.9% by volume oil, with the balance comprising water and cells.

Equivalents

Those skilled in the art will recognize or be able to ascertain using no more than routine experimentation many equivalents to the specific embodiments of the invention described herein. Such equivalents are intended to be encompassed in the scope of the following claims.

What is claimed is:

1. A method for separating a first emulsion comprising a first continuous phase, a first discontinuous phase and fine solid particles, comprising the steps of:
   (a) directing the first emulsion through a first hydrocyclone, whereby the first emulsion is separated into an overflow emulsion and an underflow emulsion, said overflow emulsion comprising at least a portion of said first continuous phase, at least a portion of said first discontinuous phase and at least a portion of said fine solid particles;
   (b) inverting the phases of said overflow emulsion thereby obtaining an inverted emulsion whereby said first continuous phase of said overflow emulsion is a second discontinuous phase in said inverted emulsion and said first discontinuous phase of said overflow emulsion is a second continuous phase in said inverted emulsion;
   (c) directing said inverted emulsion through one or more subsequent hydrocyclones arranged in series; and
   (d) collecting said second continuous phase and said second discontinuous phase of said inverted emulsion, wherein said fine solid particles are collected with said second discontinuous phase.

2. The method of claim 1 wherein the solid particles have at least one dimension smaller than about 50 μm.

3. The method of claim 2 wherein the solid particles are biocatalyst particles.

4. The method of claim 3 wherein the first continuous phase is aqueous.

5. The method of claim 4 wherein the overflow emulsion of step (a) is inverted by directing said overflow emulsion through an in-line mixer.

6. The method of claim 5 wherein the in-line mixer is a static mixer.

7. The method of claim 5 further comprising the step of pressurizing the inverted emulsion of step (b) prior to directing the said inverted emulsion to the hydrocyclone of step (c).

8. The method of claim 7 wherein step (c) comprises directing the inverted emulsion through two or more dehydrating hydrocyclones.

9. The method of claim 4 wherein the overflow emulsion of step (a) is inverted by a pressure drop across the first hydrocyclone.

10. A method for separating a first emulsion comprising a continuous aqueous phase, a discontinuous oil phase and cellular biocatalyst, comprising the steps of:
    (a) directing the first emulsion from an emulsion source through a first de-oiling hydrocyclone, whereby the first emulsion is separated into an overflow emulsion and an underflow emulsion, said overflow emulsion comprising at least a portion of said continuous aqueous phase, at least a portion of said discontinuous oil phase and at least a portion of said cellular biocatalyst;
    (b) inverting the phases of said overflow emulsion, thereby obtaining an inverted emulsion whereby said continuous aqueous phase of said overflow emulsion is a discontinuous aqueous phase in said inverted emulsion and said discontinuous oil phase of said overflow emulsion is a continuous oil phase in said inverted emulsion;
    (c) directing said inverted emulsion through one or more dehydrating hydrocyclones arranged in series; and
    (d) collecting said continuous oil phase as a substantially pure oil and said discontinuous aqueous phase of said inverted emulsion; wherein said cellular biocatalyst is collected with said discontinuous aqueous phase.

11. The method of claim 10 wherein the cellular biocatalyst comprises bacterial cells.

12. The method of claim 11 wherein the bacterial cells are Rhodococcus cells.

13. The method of claim 10 wherein the emulsion source is a biodesulfurization reactor.

14. The method of claim 10 further comprising the step of pressurizing the first emulsion prior to directing the emulsion through the deoiling hydrocyclone.

15. The method of claim 14 wherein the first emulsion is pressurized to at least about 120 psi.

16. The method of claim 10 further comprising the step of mixing the inverted emulsion of step (c) with between about 1% by volume and about 10% by volume of fine water droplets, prior to directing the emulsion to a dehydrating hydrocyclone.

17. The method of claim 16 wherein the inverted emulsion of step (c) is mixed with fine water droplets immediately prior to directing the emulsion to an ultimate dehydrating hydrocyclone.

18. The method of claim 10 further comprising the step of directing the substantially pure oil overflow of step (c) through a de-watering means, whereby the substantially pure oil is further purified, prior to collecting the oil.

19. The method of claim 18 wherein the de-watering means is an electrostatic precipitation unit, a settling tank, a cross flow filter, a centrifuge or a coalescing membrane filter.

* * * * *